Jan. 26, 1971    G. K. C. CAMPBELL    3,557,551
GAS TURBINE ENGINE WITH ROTATING COMBUSTION CHAMBER
Filed Sept. 26, 1968    2 Sheets-Sheet 1
FIG_1
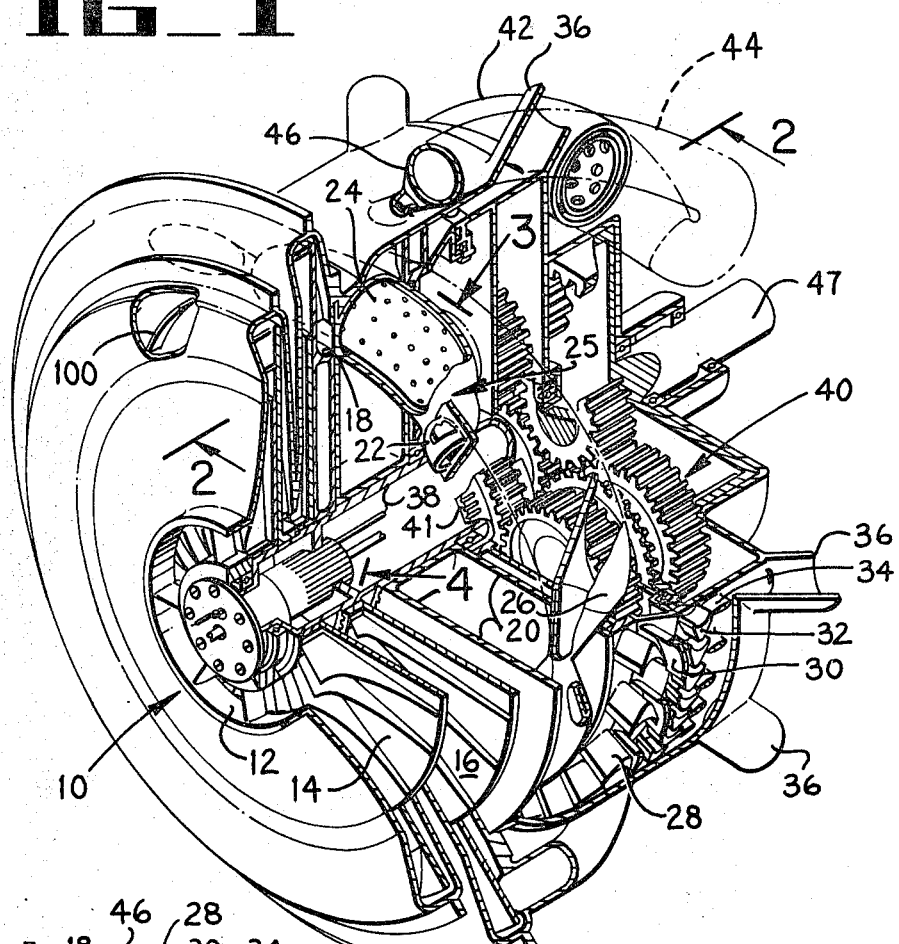
FIG_2
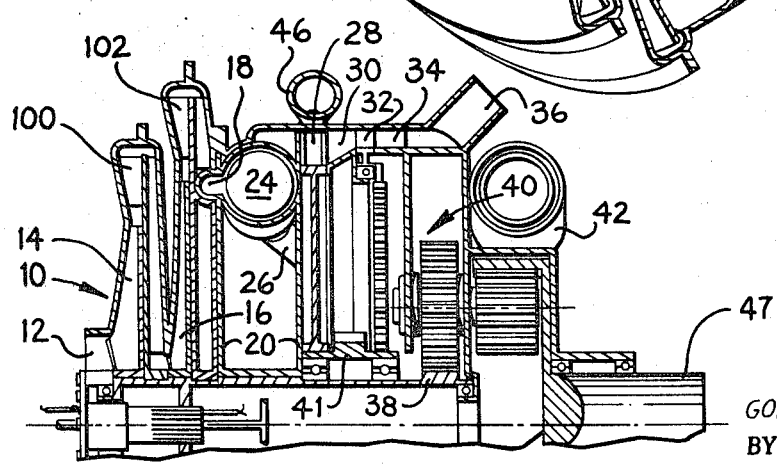
INVENTOR.
GORDON KEITH COLIN CAMPBELL
BY
*Lindenberg & Freilich*

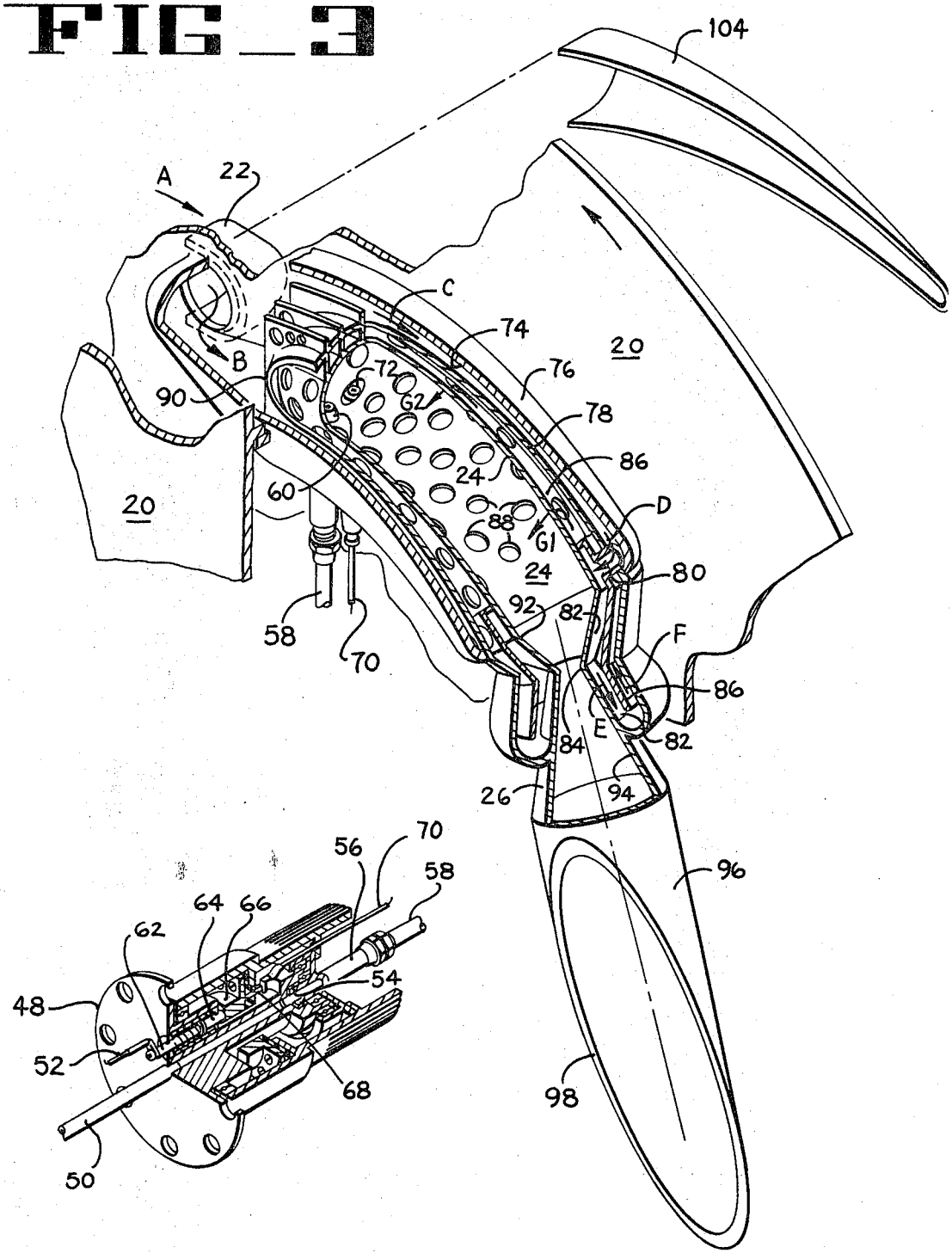

United States Patent Office 3,557,551
Patented Jan. 26, 1971

---

1

3,557,551
GAS TURBINE ENGINE WITH ROTATING COMBUSTION CHAMBER
Gordon Keith Colin Campbell, 1007 E. Rose Circle, Los Altos, Calif. 94022
Filed Sept. 26, 1968, Ser. No. 762,916
Int. Cl. F02c 3/16
U.S. Cl. 60—39.16                3 Claims

ABSTRACT OF THE DISCLOSURE

A gas turbine engine which can utilize high velocity gas jets to attain high efficiency and power output comprising a rotatable combustor wheel on which the combustion chamber and nozzle are mounted. The nozzle forms a gas jet which falls directly on a turbine blade wheel to drive it, and to rotate the combustor wheel in the opposite direction by jet reaction. Air is fed to the combustion chamber through a scoop mounted on the combustor wheel near its circumference, to efficiently boost air pressure and achieve the required high air flow.

BACKGROUND OF THE INVENTION

Field of the invention

The invention relates to gas turbine type engines.

Description of the prior art

Gas turbine engines have generally included a stationary combustion chamber or burner where injected gasoline or other fuel and air from a compressor is mixed and burned. The burned gas passes through a nozzle which directs it against the blades of a rotating turbine blade wheel that delivers power through its shaft. High efficiency and high power output from such engines depends upon the use of gas jets of high velocity being directed at the turbine blade wheel. However, if the the jet velocity increases to a very high level, large thermal and mechanical stresses are imposed on the blade which causes mechanical failure.

Large mechanical stresses on the order of 25,000 p.s.i. radial and 50,000 p.s.i. tangential are produced in available engines by reason of the high rotational speeds, such as 13,000 r.p.m. for a 3 foot diameter turbine blade wheel. When these are combined with high temperatures such as 1500° F. imposed by the gas jet, the conditions become close to the limits of strength of the best available turbine blade materials. Higher gas jet speeds can be readily obtained, but they cannot be efficiently used because they result in excessive mechanical stresses or heating. That is, if the blade wheel is allowed to rotate faster this causes excessive mechanical stress, while if the gas jet is moving too fast relative to the blades (e.g., more than about Mach 1) then this causes excessive heating of the blade. Furthermore, the higher gas jet speeds are obtained by using only small amounts of excess air which results in even higher gas temperatures.

In present gas turbine engines, long life is obtained by using large quantities of extra air, to produce gas jets of moderate temperature and velocity and moderate rotational speed of the turbine blade wheel. The result is relatively low efficiencies, usually below 30% thermal efficiency even for large units, and a limited power output for a given size of engine.

Engines have been proposed that reduce the relative speed at which the gas jet strikes a following wheel. For example, Pat. No. 3,009,319 entitled Turbojet Engine by G. D. Filipenco describes an engine wherein the combustion chamber rotates in a direction opposite to the turbine blade wheel. However, none of the proposed engines have been capable of high efficiency or power output. High efficiency and power requires that large quantities of highly compressed air be fed to the combustion chamber, in addition to the fuel, and that the engine be capable of utilizing a gas jet with nozzle velocity greatly in excess of Mach 1. The foregoing patent and others have generally delivered compressed air through a central tube to the rotating combustion chamber, which limited the quantity of gas and therefore the engine power. Also, the gas jet issuing from the nozzle has required turning by stationary vanes prior to striking a first rotatable turbine blade wheel. This resulted in a very high relative velocity between the gas jet and vanes, and if a gas jet greatly in excess of Mach 1 were used, the efficiency would be very low.

Objects and summary of the invention

One object of the present invention is to provide a gas turbine engine of high efficiency.

Another object is to provide a gas turbine engine of high power to weight ratio.

Another object is to provide a gas turbine engine of high power to total air intake ratio.

In accordance with the present invention, a gas turbine engine is provided which utilizes a high velocity gas jet to obtain high efficiency and high power output, but which employs available materials which can operate at only limited temperature and stress levels. The combustion chamber, wherein compressed air and injected fuel are burned, is mounted on a rotating wheel next to the turbine blade wheel. The nozzle at the rear of the combustion chamber generally directs the burned gases against the turbine blade wheel. This gas jet drives the blade wheel in one direction, and rotates the combustion chamber wheel in an opposite direction by reaction to the gas jet issuing from the nozzle. Both the rotating combustion chamber wheel and the turbine blade wheel deliver power to the engine output shaft.

The use of a contra-rotating combustion chamber wheel on which the nozzle is mounted, permits the use of very high gas jet velocities. This is because the velocity at which the jet strikes the turbine blade wheel is reduced by the backward speed of the nozzle. This backward nozzle velocity produces power because the combustion chamber wheel is connected through gears to the output shaft of the engine. This additional source of engine power results in considerably greater power output for an engine of given size and weight. The high gas jet velocities are readily obtained by employing less excess air, and this has the additional advantage of requiring only a small air compressor.

Air for burning in the combustion chamber is obtained through a scoop mounted on the combustion chamber wheel near the periphery thereof. The scoop moves around an annulus, which receives air from a rotary compressor such as a series of centrifugal compressor blades. The scoop further increases the pressure, and delivers large quantities of air to the combustion chamber.

The novel features of the invention are set forth with particularity in the appended claims. The invention will be best understood from the following description when read with the accompanying drawings.

Brief description of the drawings

FIG. 1 is a front perspective view of a gas turbine engine constructed in accordance with the invention;

FIG. 2 is a partial sectional view of the engine of FIG. 1;

FIG. 3 is a rear perspective view of the combustion chamber wheel of the engine of FIG. 1; and FIG. 4 is a front perspective view showing the electrical and fuel input apparatus of the engine of FIG. 1.

Description of the preferred embodiments

FIG. 1 illustrates a gas turbine engine comprising a compressor 10 which draws in air through an intake 12, and compresses it with a pair of centrifugal compressor blades 14 and 16 arranged in series. The compressed air is exhausted into an annular air outlet area 18. A combustion chamber wheel, which also may be referred to as a nozzle wheel or combustor wheel 20, receives the compressed air through a scoop 22. The scoop further compresses the air and carries it to a combustor basket 24 of a burner or combustion chamber assembly 25. Gasoline or other fuel is also injected into the basket 24, and the air-fuel mixture is burned to create a hot, high pressure gas. This gas passes through a nozzle 26 at the rear end of the combustor basket 24, which forms it into a high velocity gas jet. The combustor wheel 20 actually carries a series of combustors, such as three, each of which has a nozzle, and the basket 24 and a nozzle at 26 shown in FIG. 1 are from different combustors.

The gas jet issuing from the nozzle 26 is directed with an appreciable component parallel to the axis of rotation, at a first turbine blade wheel 28 located on one axial side of the combustor wheel, to rotatably drive the turbine blade wheel. A stationary turbine blade set 30 directs the gas issuing from the first blade wheel at a second blade wheel 32, to rotatably drive it. The gas issuing from the second blade wheel is directed against an exhaust blade set 34 which allows it to exit through exhaust pipes 36.

The combustor wheel 20 on which the combustor basket 24 and nozzle 26 are mounted, is allowed to rotate. It is rotatably driven by the reaction of the gas jets issuing from the nozzles. The combustor wheel is fixed to a hollow drive shaft 38, to drive this shaft and a gear 41 fixed to it. The gear 41 is coupled through a transmission 40 to an engine output shaft 47. The turbine blade wheels 28 and 32 are also coupled through the gear transmission 40 to the output shaft 47. Thus, both the combustor wheel and the turbine blade wheels supply power to the output shaft 47, which can be used to drive electrical generators, vehicles, or in a variety of other applications. It should be understood that some of the engine power is used to turn the air compressor blades 14 and 16 which are fixed to the combustor wheel shaft 38, and to overcome the drag of the scoop 22. The rest of the power (minus friction and other losses) is available to do work.

The engine shown in FIG. 1 includes a starter 42 which burns fuel and air and sends the gases through a tube 44 to a starter nozzle 46. The gas issuing from starter nozzle 46 strikes the first turbine blade wheel 28 to accelerate it, and to thereby rotate the shaft 38 which drives the air compressor blades 14 and 16. The first amount of compressed air and fuel entering the combustor basket 24 is ignited with the aid of a glow plug, but the fuel soon becomes self-igniting. Soon after the engine starts, the starter 42 is turned off and power can be taken from the output drive shaft 47.

FIG. 4 shows the fuel and electrical connections to the combustor wheel 20. A stationary hub flange 48 supports a stationary fuel line 50 and an electrical terminal 52. Gasoline or other fuel from a tank is received under pressure through the fuel line 50, which carries it past a rotary seal 54 to a rotating fuel pipe 56. The pipe 56 is concentric with the drive shaft 38, and is coupled to a radial fuel line 58 that leads to a fuel injection nozzle 60 in the combustor basket 24. Fuel ejected through the nozzle 60 mixes with air in the basket to produce a combustable mixture.

Electrical current supplied to the terminal 52 passes along an insulated wire 62 to a brush 64. The brush contacts a slip ring 66 which is connected through an insulated wire 68 to a radial wire 70. The wire 70 carries the current to a glow plug 72 in the combustor basket to heat the plug and thereby ignite the fuel-air mixture. Generally, the glow plug is required only at the beginning of operation, until stable ignition is achieved.

FIG. 3 is a rear perspective view of the combustor wheel 20, in which the path of air flow is shown by the arrows A through G. Air at A enters the air scoop 22 and flows along the path B through a diffuser to an outer annulus 74 formed between an outer combustor cover 76 and a first wall 78. The air flow at C cools the cover 76 and wall 78, and the air then flows along a path D through a manifold 80. The manifold comprises several short tubes that lead the air along a path E through a passageway 82. The passageway extends past the throat 84 of the nozzle 26, and the air at E cools the nozzle. The air then flows along path F between the tubes of the manifold 80 into an inner annulus 86.

The annulus 86 is formed by the first wall 78 and the combustor basket 24. The basket 24 has numerous holes 88 for admitting air from the inner annulus, and the air flows along paths G1 and G2 into the basket. The air undergoes large changes in temperature during passage along path portions A through G. During passage through portions C through G, the temperature is relatively low because of the narrowness of the path, which produces a high air velocity and low pressure. Accordingly, the air serves as an efficient cooling medium to cool the nozzle and combustor basket assembly. It may be noted that, while a liquid can be used for cooling, it cannot expand as can a gas and therefore its temperature cannot be readily lowered by high velocity passage.

Some of the air, particularly that admitted at G2 near the front end 90 of the basket, mixes with injected fuel and is burned. The rest of the air, particularly that admitted at G1 near the rear end 92 of the basket mixes with the combustion products or burned gas to cool it. The burned gas passes through the throat 84 and an expansion area 94 of the nozzle to an exit tube 96. The exit tube has one long elliptical aperture 98 through which issues a high velocity jet. This gas jet strikes the first turbine blade wheel to drive it, as well as to drive the combustor wheel 20 by reason of the jet reaction.

The high efficiency of the engine of this invention is largely due to the rotating combustors and nozzles which enable the useful employment of very high gas jet velocities. A description of typical operating conditions will enable a better understanding of the invention. The engine in the following description is assumed to be a stationary gas turbine engine of about three feet housing diameter. Air entering the engine through the compressor intake 12, shown at FIG. 1, is typically at 70° F. and 15 p.s.i. The two centrifugal compressor blades 14 and 16, and two sets of diffuser blades 100 and 102 that convert the air velocity into high pressure, provide a pressure of 235 p.s.i. in the annular outlet area 18. The air scoop 22, which moves at a speed of about 1500 f.p.s. compresses the air to provide a pressure of about 400 p.s.i. (and a temperature of about 800° F.) in the basket 24 where the air is moving at about 200 f.p.s.

Referring now to FIG. 2, the high pressure air passes along the paths A through G into the combustor basket 24. A relatively high density of holes 88 is provided near the fornt end 90 of the basket, where air is directed along the path G2 to the area where fuel is injected and burned. A lower density of holes is provided near the rear end 92, where the air entering along the path G1 mixes with the gas to cool it. The density of holes can be varied to change the operating conditions. The temperature of the burning gas at the rear end 90 of the basket is about 4500° F., which is the temperature obtained by a nearly 16 to 1 ratio of fuel to air with the air at approximately 900° F. A nearly 16 to 1 fuel to air ratio is necessary to assure ignition. The burning gas mixes with the extra air at the rear end 92 and passes through the throat 84 of the nozzle at a temperature of about 3000° F., when approximately 100% excess air is used. The expansion area 94 of the nozzle converts this to a gas jet of about 1100° F. and a velocity of about 5,200 f.p.s. relative to the nozzle.

The combustor wheel rotates at about 13,000 r.p.m. which results in a velocity of the nozzle 26 of about 1,500 f.p.s. Accordingly, the gas jet issuing from the nozzle has a net speed of about 3,700 f.p.s. The first turbine blade wheel 28 rotates at a speed of about 18,000 r.p.m., so that its turbine blades move at about 1,850 f.p.s. Accordingly, the gas jet strikes it at a relative speed of about 1,850 f.p.s. This is approximately Mach 1 for the gas jet conditions, so only a relatively small increase in gas temperature occurs and the turbine blade is heated to about 1350° F. This is not much greater that the gas jet temperature and normally will not cause thermal stress problems. The second turbine blade wheel 32 further reduces the gas velocity to derive additional power.

As noted above, the gas turbine engine utilizes a gas jet of high velocity, such as 5,200 f.p.s. This may be compared to prior art engines wherein a stationary nozzle is used, and a gas jet velocity of only about 4,000 f.p.s. can be utilized. Both the speed at which the gas jet hits the turbine blade and the speed at which the turbine blades move are about the same as in prior art engines. Thus, turbine blade wheels can be employed which use known materials and designs. The higher gas jet speed allows additional power to be obtained, through the rotating combustor wheel 20, to provide a gas turbine engine of very high efficiency.

In addition to the advantage of higher efficiency, the engine, of this invention produces a greater power output for a given size of engine. This is due partly to the fact that the combustors and nozzles, which are also present in prior art engines, are here utilized to create additional power apart from that produced by the turbine blade wheel. A further reduction in size and weight is realized by reason of the fact that less air is employed for a given power output. As mentioned above, some extra air is admitted at the area of the combustor basket to mix with the burned air and lower the gas temperature from about 4500° F. to about 3000° F. at the nozzle throat. After expansion through the nozzle, the gas temperature is reduced to about 1100° F. In prior art engines, smaller gas jet velocities such as 3,700 f.p.s. were used as opposed to the 5,200 f.p.s. used in the present engine.

The use of the air scoop 22 enables very high air inlet pressures to be obtained for the combustors without many additional compressor wheels. One scoop is provided for each combustor basket. Each scoop moves at a speed of approximately Mach 0.9, so a streamline fairing shown as 104 is provided behind each scoop. The scoop essentially uses its high speed to create a high pressure at the combustor basket.

The set of centrifugal blades 14 and 16 compress the air from about 15 p.s.i. to about 235 pi.s.i. reached at the annulus 18, using about 290 horsepower per pound of air. The scoop 22 compresses the relatively stationary air in the annulus 18 to a pressure of about 400 p.s.i. in the combustor basket where it is moving at about 200 f.p.s., using about 62 horsepower per pound of air. The scoop has a high efficiency in raising the high pressure air to an even higher pressure level. If a simple hole in the combustion wheel were employed instead of a scoop, and additional centrifugal compressor blades were added to obtain the same increase in pressure, it has been calculated that about 300 horsepower would be required to obtain the same pressure of 400 p.s.i. at the combustor basket. In addition to the good efficiency, the scoop provides a small and low cost means, for obtaining an additional increase in pressure for the rotating combustors.

While the invention can be used to provide a high efficiency engine, it can also be used to provide a low cost moderately low efficiency engine. This can be done by eliminating the costly turbine blade wheels and taking power only from the combustor wheel.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:
1. An engine comprising:
an engine housing;
a wheel rotatably mounted on said housing;
a combustion chamber mountesd on said wheel;
a nozzle coupled to said chamber for exhausting a gas jet in a direction to rotate said wheel;
means for conveying fuel to said combustion chamber;
means defining an air receiving area adjacent to said wheel;
means defining an air passageway in said wheel, said passageway having a first portion opening onto said air receiving area to receive air therefrom, a second portion coupled to said combustion chamber, and a portion between said first and second portions having walls defining a narrow passageway extending along said nozzle to provide a substantially greater air velocity in said narrow passageway than the velocity of air entering said combustion chamber, to provide low temperature air for cooling said nozzle; and
compressor means for supplying compressed air to said air receiving area.

2. An engine comprising:
a rotably mounted wheel;
a combustion chamber mounted on said wheel;
a nozzle coupled to said combustion chamber to direct a gas jet in a direction to turn said wheel;
means for carrying fuel to said combustion chamber;
annulus means disposed adjacent to said wheel;
compressor means for supplying compressed air to said annulus means;
scoop means mounted on said wheel and projecting into said annulus means, sweeping said annulus means, sweeping said annulus means; and
means coupling said scoop means to said combustion chamber, defining a narrowed air passageway that extends across said nozzle to cool it.

3. An engine comprising:
a rotatably mounted nozzle wheel;
a combustion chamber mounted on said nozzle wheel;
a converging-diverging nozzle mounted on said nozzle wheel and coupled to said combustion chamber for forming a gas jet of substantially greater than Mach 1 speed, said nozzle positioned to direct said jet with a component parallel to the axis of rotation of said nozzle wheel;
a turbine blade wheel mounted on one axial side of said nozzle wheel to receive said gas jet directly from said nozzle;
means coupled to said turbine blade and nozzle wheels for receiving power from them;
an air source; and means for carrying air from said source to said combustion chamber, including a first passageway portion coupled to said source and a second passageway portion coupled to said first portion and extending adjacent to said nozzle, said second passageway portion having a smaller cross-sectional area than said first portion, whereby to cool air which passes adjacent to said nozzle.

References Cited
UNITED STATES PATENTS

| | | | |
|---|---|---|---|
| 2,425,904 | 8/1947 | Vernon | 60—39.35X |
| 2,579,049 | 12/1951 | Price | 60—39.35 |
| 2,499,863 | 3/1950 | Hart | 60—39.35 |
| 2,594,629 | 4/1952 | Exner | 60—39.35 |
| 2,709,895 | 6/1955 | Mount | 60—39.35X |
| 2,709,889 | 6/1955 | Mount | 60—39.35X |
| 2,710,067 | 6/1955 | Pesaro | 60—39.35X |
| 2,900,789 | 8/1959 | Philpot | 60—270X |
| 3,321,911 | 5/1967 | Myles | 60—39.35 |
| 3,371,718 | 3/1968 | Bacon | 60—39.35 |
| 3,371,718 | 3/1968 | Bacon | 60—39.35X |

DOUGLAS HART, Primary Examiner

U.S. Cl. X.R.

60—39.35